United States Patent [19]

Yoon

[11] Patent Number: 5,200,865
[45] Date of Patent: Apr. 6, 1993

[54] TAPE LOADING APPARATUS FOR A VIDEO TAPE RECORDER

[75] Inventor: Ki-chay Yoon, Suwon, Rep. of Korea

[73] Assignee: Samsung Electronics Co., Ltd., Kyunggi, Rep. of Korea

[21] Appl. No.: 636,507

[22] Filed: Dec. 31, 1990

[30] Foreign Application Priority Data

Dec. 29, 1989 [KR] Rep. of Korea .................. 89-20528

[51] Int. Cl.$^5$ .......................................... G11B 5/027
[52] U.S. Cl. ................................ 360/85; 360/95
[58] Field of Search ........................... 360/85, 95

[56] References Cited

U.S. PATENT DOCUMENTS

| | | | |
|---|---|---|---|
| 4,410,919 | 10/1983 | Umeda | 360/85 |
| 4,688,120 | 8/1987 | Muller | 360/85 |
| 4,789,912 | 12/1988 | Masuda et al. | 360/85 |
| 4,853,804 | 8/1989 | Suwa et al. | 360/85 |

FOREIGN PATENT DOCUMENTS

| | | |
|---|---|---|
| 074149 | 3/1983 | European Pat. Off. |
| 092275 | 10/1983 | European Pat. Off. |
| 2831333 | 1/1980 | Fed. Rep. of Germany |
| 2194666 | 3/1988 | United Kingdom |

Primary Examiner—David J. Severin
Attorney, Agent, or Firm—Cushman, Darby & Cushman

[57] ABSTRACT

A tape loading apparatus for a video tape recorder is disclosed. The apparatus adopts a movable plate which rectilinearly moves along a couple of guiders by the swiveling of a lever, instead of a conventional loading gear. Therefore, the present invention effect a simple structure and does not requires high accuracy in assembly, thus provides a tape loading apparatus of low power loss and production cost and high productivity.

4 Claims, 3 Drawing Sheets

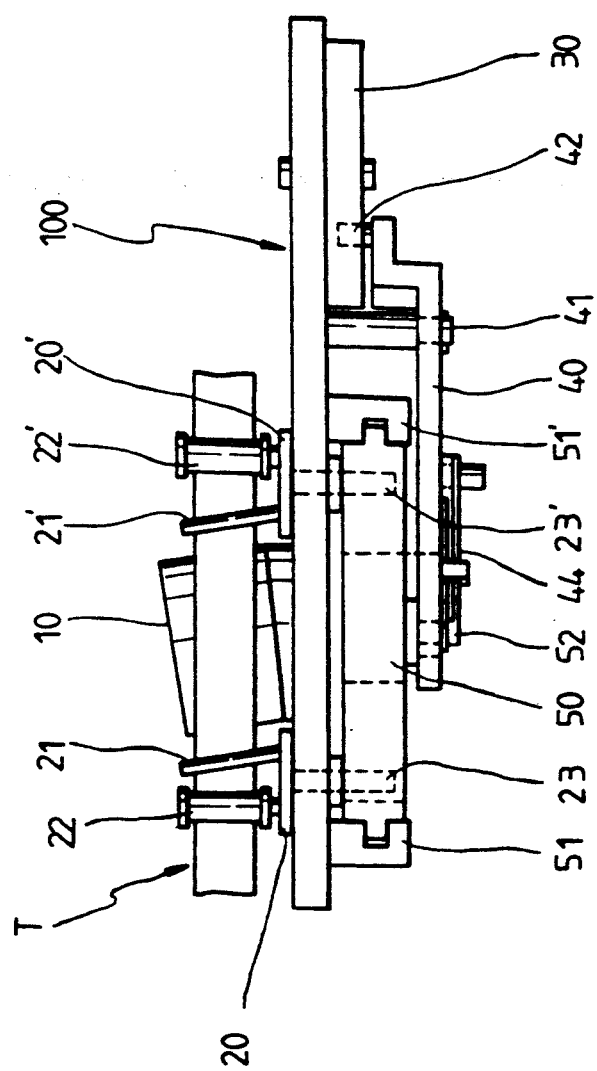

TAPE LOADING APPARATUS FOR A VIDEO TAPE RECORDER

BACKGROUND OF THE INVENTION

The present invention relates to a tape loading apparatus for a video tape recorder (hereinafter called the VTR).

In general, there are two types of recording/reproducing heads for a VTR according to its loading method, i.e. fixed and rotating types.

A tape advancing system provided with the fixed head has a simple construction for abutting directly the head to the tape in the cassette, while the system equipped with a rotating head has a complex construction due to a loading system for drawing out the tape from the cassette and abutting it to a head drum.

One example of a tape loading apparatus of rotating head type is generally known as shown in FIG. 1. Referring to FIG. 1 two guide means G and G' installed on the pole bases PB and PB' are respectively engaged with the guide grooves S and S' formed at the respective sides of a head drum HD. The pole bases PB and PB' are connected to the ends of the corresponding loading arms LA and LA' through the links L and L', while the loading arms LA and LA' are respectively secured to the loading gears LG and LG' which engaged with each other to rotate together. The loading apparatus further comprises a driving motor M, a worm W, a worm gear WG, a cam gear CG, and a sector gear arm GA to drive the loading gears LG and LG'.

Moreover, some other prior arts have been known, but most of them are directed to modify the transmitting mechanism between the loading gears LG, LG' and the driving motor M.

The above mentioned loading apparatus have some drawbacks due to the complex structure of its transmitting mechanism and resultant necessity of many parts. That is, problems of the high power loss and production cost, occurrence of malfunction etc, are caused by accumulated tolerances and poor productivity.

SUMMARY OF THE INVENTION

Therefore, it is an object of the present invention to provide an improved tape loading apparatus which adopts the driving system of a simple slide mechanism, not of conventional loading gear, so that effects a compact construction and good productivity.

To accomplish the above object, the tape loading apparatus according to the present invention comprises:
 a rotating head drum;
 two movable pole bases respectively having tape guides for abutting the tape to the outer surface of the head drum, and being movable along the respective sides of the head drum;
 a means for transmitting power;
 a lever for swiveling within a certain arcuate path by the power transmitting means;
 a movable plate for being connected to the free end of the lever and for rectilinearly sliding along guiders from the tape inserting position to the both side positions of the head drum; and
 a means for connecting the two pole bases, the lever and the movable plate to displace the two pole bases along the corresponding paths and elastically maintain them at the displaced positions, the two pole bases being driven by the lever and the movable plate.

Further objects and features of the present invention will be more apparent from the following detailed descriptions with reference to the accompanying drawings.

BRIEF DESCRIPTION OF THE DRAWINGS

FIG. 4 is a side view showing the tape loading apparatus according to the present invention.

DETAILED DESCRIPTION

Figure 1:
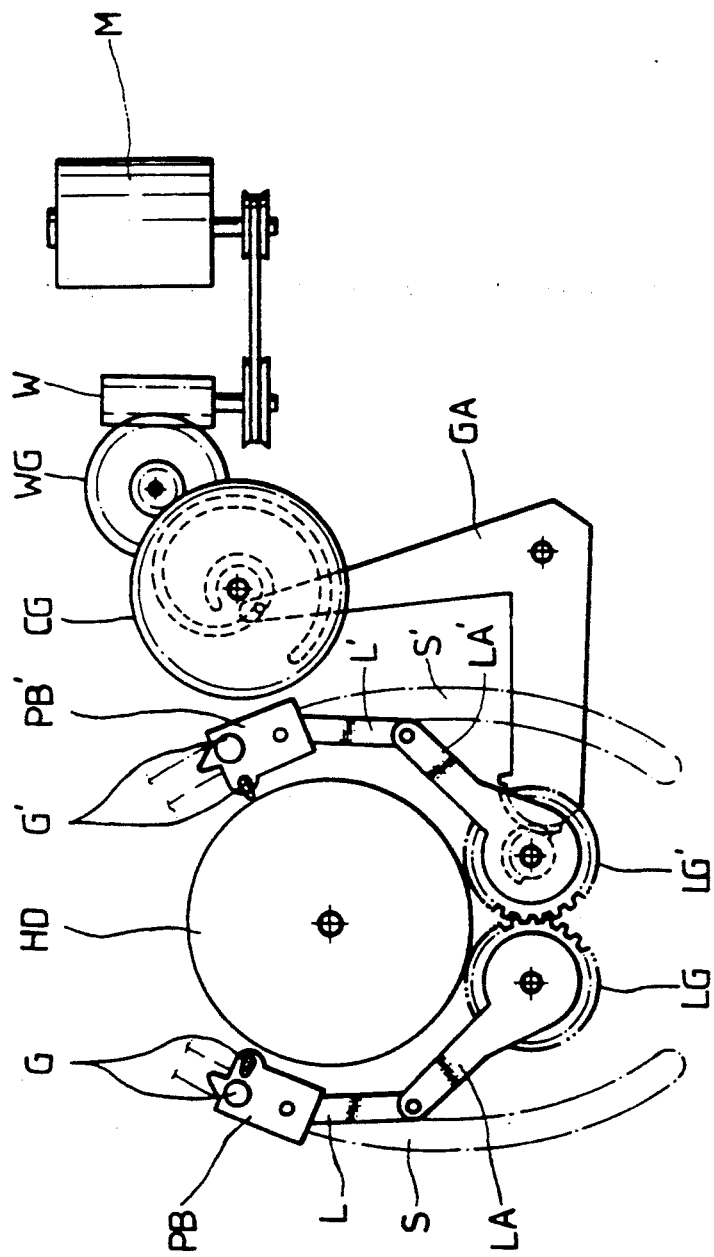
FIG. 1 is a schematical plan view showing a conventional tape loading apparatus.
Figure 2:
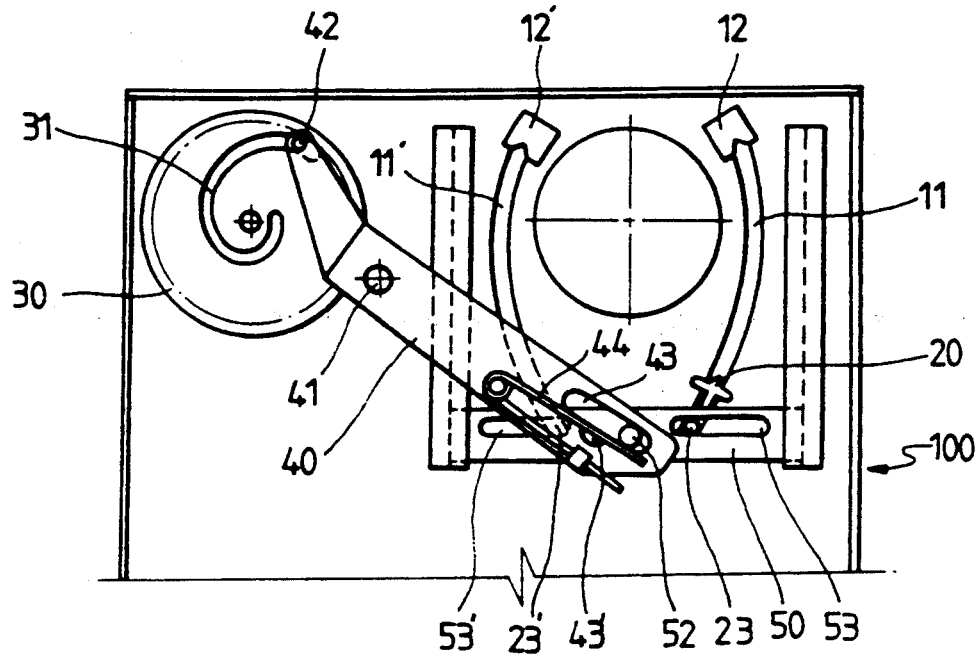
FIG. 2 is a bottom view showing the tape loading apparatus according to the present invention, especially in the tape unloading state.
Figure 3:
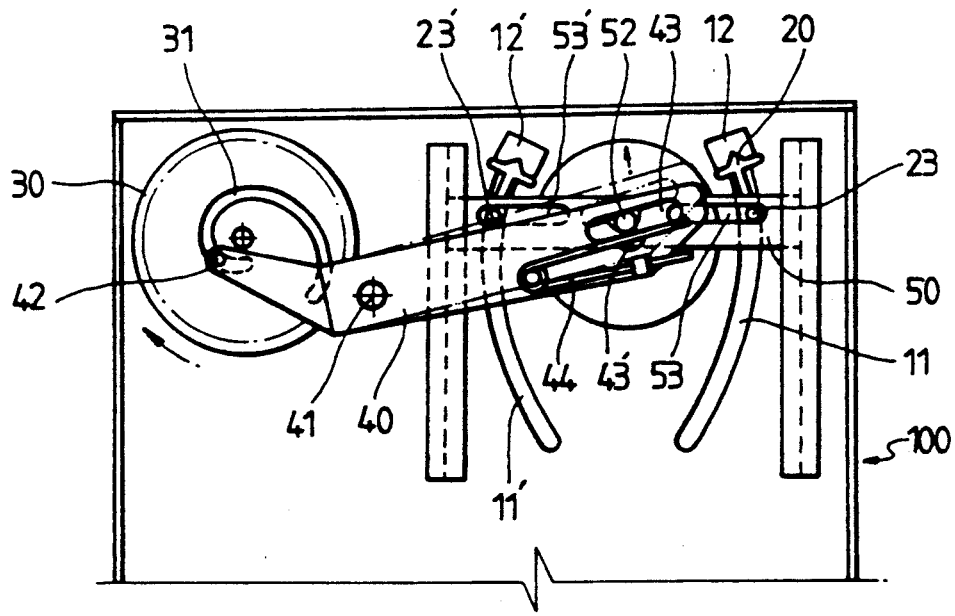
FIG. 3 is a view similar to FIG. 2, except in the tape loading state.

FIG. 2 illustrates the tape unloading state of the tape loading apparatus according to the present invention and FIG. 3 shows the tape loading state of the present invention. FIG. 4 is a side view showing the tape loading apparatus according to the present invention.

In the drawings, a head drum 10 is mounted on the base 100 in inclined state, and two pole bases 20 and 20' are respectively engaged with the guiding grooves 11, 11' formed at the respective sides of the head drum. The head drum 10 is provided with a plurality of heads which are not shown. The pole bases 20 and 20' include slant poles 21 and 21', each of which being parallel to the outer surface of the head drum 10, vertical guide rollers 22 and 22' for limiting the upper and lower ends of the tape T, and guide bosses 23 and 23' protruding downward to be interconnected through the guiding grooves 11 and 11'. At the ends of the guiding grooves, stoppers 12 and 12' for restricting the displacements of the guide bosses 23 and 23' are provided.

At the bottom of the base 100, there is provided with a cam gear 30 having cam groove 31 of acute path, the gear being driven by a driving means, for example a driving motor which is not shown.

And a lever 40 for being rotated about a support pin 41 and having a hinge boss 42 which engages with the cam groove 31 of the cam gear 30, experiences an swiveling movement by the cam gear 30.

A movable plate 50 is connected to one end of the lever 40. The movable plate 50 is transversely elongated between two guiders 51 and 51' which elongate to the longitudinal direction in parallel, and then the movable plate is able to slide along the guiders, the either ends of the plate being supported by corresponding guiders.

To connect the movable plate and the free end of the lever 40, an elongated hole 43 is formed at the lever 40, and a connecting boss 52 is provided at the middle of the movable plate 50, being engaged with each other. A torsion spring 44 is mounted on the lever 40, one end of which is fixed to the lever 40 and the other end to the connecting boss 52. At the side of the elongated hole 43, a recess 43' having a larger diameter than that of the connecting boss 52 for allowing the deformation of the torsion spring 44.

Furthermore, two transversely elongated holes 53 and 53' are formed at respective side portions of the movable plate 50 and the guide bosses 23 and 23' of the pole bases 20 and 20' is inserted to the elongated holes to be connected.

Now, the apparatus will be described in its operation.

In the tape unloading state as shown in FIG. 2, if the cam gear 30 is driven clockwise, the hinge boss 42 mounted at one end of the lever 40 follows the cam groove 31, the radius of which being reduced due to the rotation, thus the lever swivels about the support pin 41. Then the movable plate 50, the connecting boss 51 of which being engaged with the elongated hole 43 formed at the free end of the lever, is displaced to the head drum 10, being guided by the guiders 51 and 51'.

At the same time, two pole bases 20 and 20' having guide bosses 23 and 23' engaged with the elongated holes 53 and 53' of the movable plate 50, are displaced to respective sides of the head drum 10 along the guide grooves 11 and 11'. Thus the tape T of the tape cassette, which is not shown, being loaded at the prescribed position of the base 100, is drawn out to abut to the circumferential surface of the head drum 10 by the slant poles 21 and 21' and guide rollers 22 and 22' of the pole bases 20 and 20' as shown in FIG. 4.

Then the apparatus becomes the state as shown in FIG. 3 by solid lines. But in this state, the status of the pole bases 20, 20' is unstable so that it cannot guide the advance of the tape T properly. If the cam gear 30 further rotates, the pole bases 20 and 20' and the movable plate 50 are mechanically fixed, as the pole bases 20 and 20' contact with the stoppers 12 and 12' provided at the ends of the guiding grooves 11 and 11'. While, at the free end of the lever at which the connecting boss 52 of the movable plate 50 being connected, there is an elongated hole 43 provided with a recess 43' having larger diameter than that of the boss, therefore the torsion spring 44 elastically biased to the connecting boss 52 is further contracted to the state shown in dotted line of FIG. 3. As the result, the torsion spring 44 locks the movable plate 50 with a strong elastic force, thus the pole bases 20 and 20' maintains immovable. By this, the loading of the tape T is completed, and the running mode for recording or reproducing is allowed.

And the unloading of the tape T is performed by counter-clockwise rotation of the cam gear 30.

As described above, the tape loading apparatus according to the present invention simplifies the structure and reduces the number of parts required by adopting a simple displacement mechanism, a movable plate instead of the conventional loading gear. As the result, the power loss and the production cost are reduced. And, the productivity is improved and the defection rate is lowered, as the assembly accuracy being lowered.

While the invention has been described in its preferred embodiment, it is to be understood that modifications can be made by those skilled in the art without departing from the scope of the following claims.

What is claimed is:

1. A tape loading apparatus for a video recorder comprising:
    a rotating head drum;
    two movable pole bases respectively having tape guides for abutting a tape to an outer surface of said head drum, and being movable along respective sides of said head drum;
    (a) means for transmitting power to load and unload the tape;
    a lever for swiveling within a certain arcuate path by said power transmitting means;
    a movable plate connected to a free end of said lever and for rectilinearly sliding along guiders from a tape inserting position to a side position of said head drum; and
    means for connecting said two pole bases, said lever and said movable plate to displace said two pole bases along corresponding paths and elastically maintaining same at displaced positions, said two pole bases, being driven by said lever and movable plate.

2. A tape loading apparatus for a video recorder as claimed in claim 1, wherein said lever comprises a hinge boss which engages with a predetermined cam groove, said lever being swivelled by a cam gear having said cam groove, and being rotated about a support pin.

3. A tape loading apparatus for a video recorder as claimed in claim 2, wherein said movable plate comprises an elongated hole formed thereon, and a connecting boss provided at the middle portion thereof, on which lever a torsion spring is mounted, one end of which is fixed to said lever and the other end is fixed to said connecting boss, wherein at one side of said elongated hole, a recess having a larger diameter than that of said connecting boss allows deformation of said torsion spring.

4. A tape loading apparatus for a video recorder as claimed in claim 3, wherein said connecting means has a structure wherein two guide bosses of said pole bases are respectively inserted in two transversely elongated holes formed at respective side portions of said movable plate.

* * * * *